United States Patent
Ishikawa et al.

(10) Patent No.: US 9,459,497 B2
(45) Date of Patent: Oct. 4, 2016

(54) LIQUID CRYSTAL DISPLAY DEVICE HAVING GUIDE PATTERNS PROVIDED AT A PERIPHERY OF A SUBSTRATE

(71) Applicants: Masato Ishikawa, Nonoichi (JP); Akira Minami, Hakusan (JP); Kenji Saito, Nonoichi (JP)

(72) Inventors: Masato Ishikawa, Nonoichi (JP); Akira Minami, Hakusan (JP); Kenji Saito, Nonoichi (JP)

(73) Assignee: JAPAN DISPLAY INC., Tokyo (JP)

( * ) Notice: Subject to any disclaimer, the term of this patent is extended or adjusted under 35 U.S.C. 154(b) by 342 days.

(21) Appl. No.: 13/730,121

(22) Filed: Dec. 28, 2012

(65) Prior Publication Data
US 2013/0182213 A1    Jul. 18, 2013

(30) Foreign Application Priority Data

Jan. 16, 2012    (JP) .................. 2012-006454

(51) Int. Cl.
 G02F 1/1339    (2006.01)
 G02F 1/1341    (2006.01)
 G02F 1/13    (2006.01)

(52) U.S. Cl.
 CPC ........... *G02F 1/1339* (2013.01); *G02F 1/1303* (2013.01)

(58) Field of Classification Search
 CPC ............ G02F 1/13394; G02F 1/1339; G02F 2001/133388; G02F 2001/13396; G02F 2001/13415
 USPC ................................................ 349/155–157
 See application file for complete search history.

(56) References Cited

U.S. PATENT DOCUMENTS

| | | | | |
|---|---|---|---|---|
| 5,680,185 A | * | 10/1997 | Kobayashi et al. | ............ 349/88 |
| 6,204,907 B1 | * | 3/2001 | Hiraishi et al. | ................ 349/155 |
| 6,466,295 B1 | * | 10/2002 | Hsieh | ............. 349/155 |
| 6,646,709 B2 | * | 11/2003 | Matsumoto | ................... 349/156 |
| 6,778,248 B1 | * | 8/2004 | Ootaguro et al. | ............. 349/153 |
| 7,508,481 B2 | * | 3/2009 | Whitehead et al. | ........... 349/153 |
| 8,643,819 B2 | * | 2/2014 | Yamamoto | ........ G02F 1/133514 349/106 |
| 8,902,397 B2 | * | 12/2014 | Hoshina | ................ G02F 1/1339 349/156 |
| 2012/0133874 A1 | * | 5/2012 | Hoshina et al. | .............. 349/138 |

FOREIGN PATENT DOCUMENTS

| | | |
|---|---|---|
| JP | 7-159795 A | 6/1995 |
| JP | 2002-40442 A | 2/2002 |
| JP | 2007-219235 | 8/2007 |
| JP | 2010-175727 A | 8/2010 |

OTHER PUBLICATIONS

Office Action issued Jun. 3, 2014, in Japanese Patent Application No. 2012-006454 with English translation.
Office Action issued on Dec. 10, 2013 in Japanese Patent Application No. 2012-006454 (with English language translation).

* cited by examiner

*Primary Examiner* — Huyen Ngo
(74) *Attorney, Agent, or Firm* — Oblon, McClelland, Maier & Neustadt, L.L.P.

(57) ABSTRACT

A liquid crystal display device includes a pair of substrates and guide patterns provided at a periphery of one substrate of the pair of substrates. The guide patterns include a first projection, a second projection on the first projection, a pair of third projections provided on each side of the first and second projections, and a pair of fourth projections formed on the pair of third projections respectively. A seal material is provided on the guide patterns and covering at least one of the first projection and the second projection, and a liquid crystal layer is provided in an area partitioned by the pair of substrates and the seal material.

4 Claims, 11 Drawing Sheets

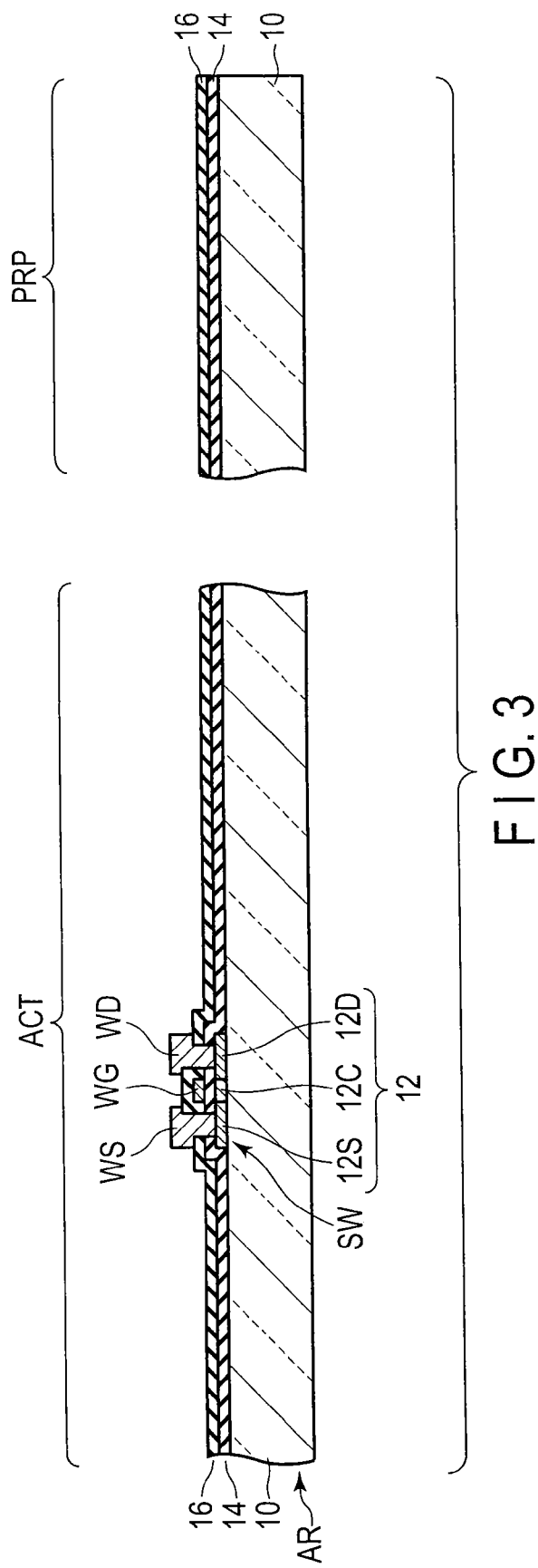
F I G. 3

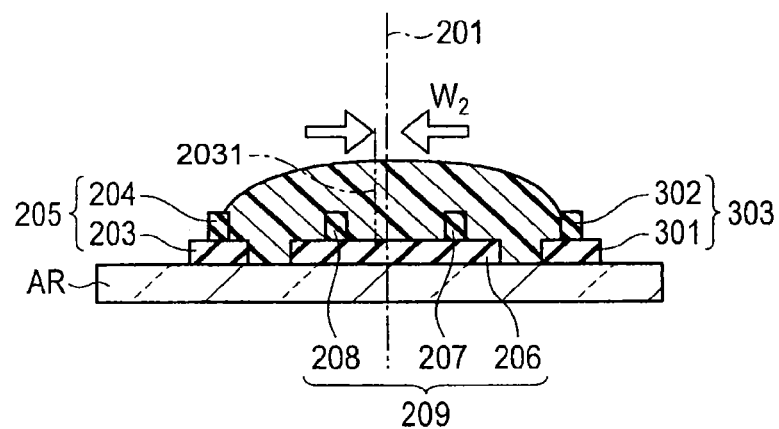
F I G. 13
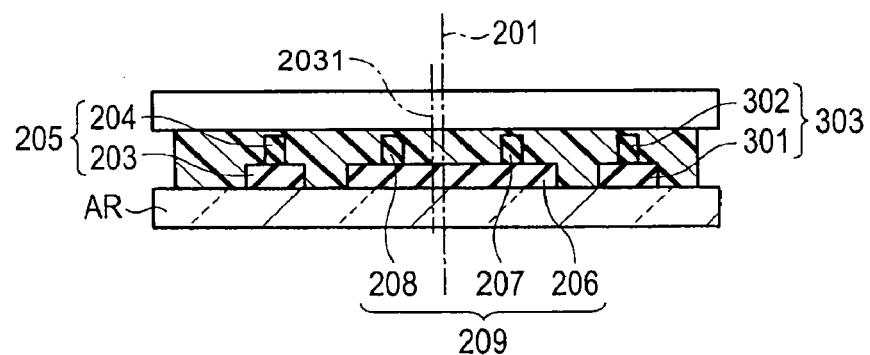
F I G. 14

LIQUID CRYSTAL DISPLAY DEVICE HAVING GUIDE PATTERNS PROVIDED AT A PERIPHERY OF A SUBSTRATE

CROSS-REFERENCE TO RELATED APPLICATIONS

This application is based upon and claims the benefit of priority from Japanese Patent Application No. 2012-006454, filed Jan. 16, 2012, the entire contents of which are incorporated herein by reference.

FIELD

Embodiments described herein relate generally to a liquid crystal display device and a method for manufacturing the liquid crystal display device.

BACKGROUND

Liquid crystal display devices are utilized in various fields as display devices for office automation equipment such as personal computers and televisions in view of their characteristics such as reduced weight, reduced thickness, and reduced power consumption. In recent years, liquid crystal display devices have also been utilized as display devices for mobile terminal equipment such as cellular phones, car navigation systems, and game machines.

As a method for forming a liquid crystal layer between a pair of substrates in such a liquid crystal display device, for example, a vacuum injection scheme or a one drop fill method is known. For example, the one drop fill method comprises coating a seal material on one of the substrates in the form of a closed loop, then dropping a liquid crystal material in the loop, laying the substrate on top of the other substrate so as to spread the liquid crystal material to form a liquid crystal layer, and hardening the seal material.

The coating of the seal material is carried out by using a dispenser to dispense the seal material so as to draw the closed loop. However, during the drawing, the dispenser may be misaligned to cause the seal material to be applied to an incorrect position, leading to an off-centered loop. Thus, the shape of the seal material may not be stable.

BRIEF DESCRIPTION OF THE DRAWINGS

FIG. 3 is a schematic cross-sectional view illustrating an example of a process of manufacturing a liquid crystal display device according to an embodiment;

FIG. 13 is a diagram illustrating the alternative embodiment of the guide pattern for use in the above-described embodiment; and FIG. 14 is a diagram illustrating the alternative embodiment of the guide pattern for use in the above-described embodiment.

DETAILED DESCRIPTION

In general, according to one embodiment, a liquid crystal display device comprises a pair of substrates, guide patterns provided at a periphery of one substrate of the pair of substrates and comprising a pair of projections configured to allow a seal material to be coated in frame form, the seal material provided on the guide patterns, and a liquid crystal layer provided in an area partitioned by the pair of substrates and the seal material.

Furthermore, according to another embodiment, a method for manufacturing a liquid crystal display device comprises:

forming guide patterns at a periphery of one substrate of a pair of substrates, the guide patterns comprising at least a pair of projections configured to allow a seal material to be coated in a frame form;

applying and coating the seal material between the guide patterns with the pair of projections; and applying a liquid crystal in an area partitioned by the pair of substrates and the seal material.

The guide patterns with the pair of projections are each, for example, a projection formed at the periphery of the substrate in a frame-like pattern.

An embodiment will be described below with reference to the drawings.

Figure 1:
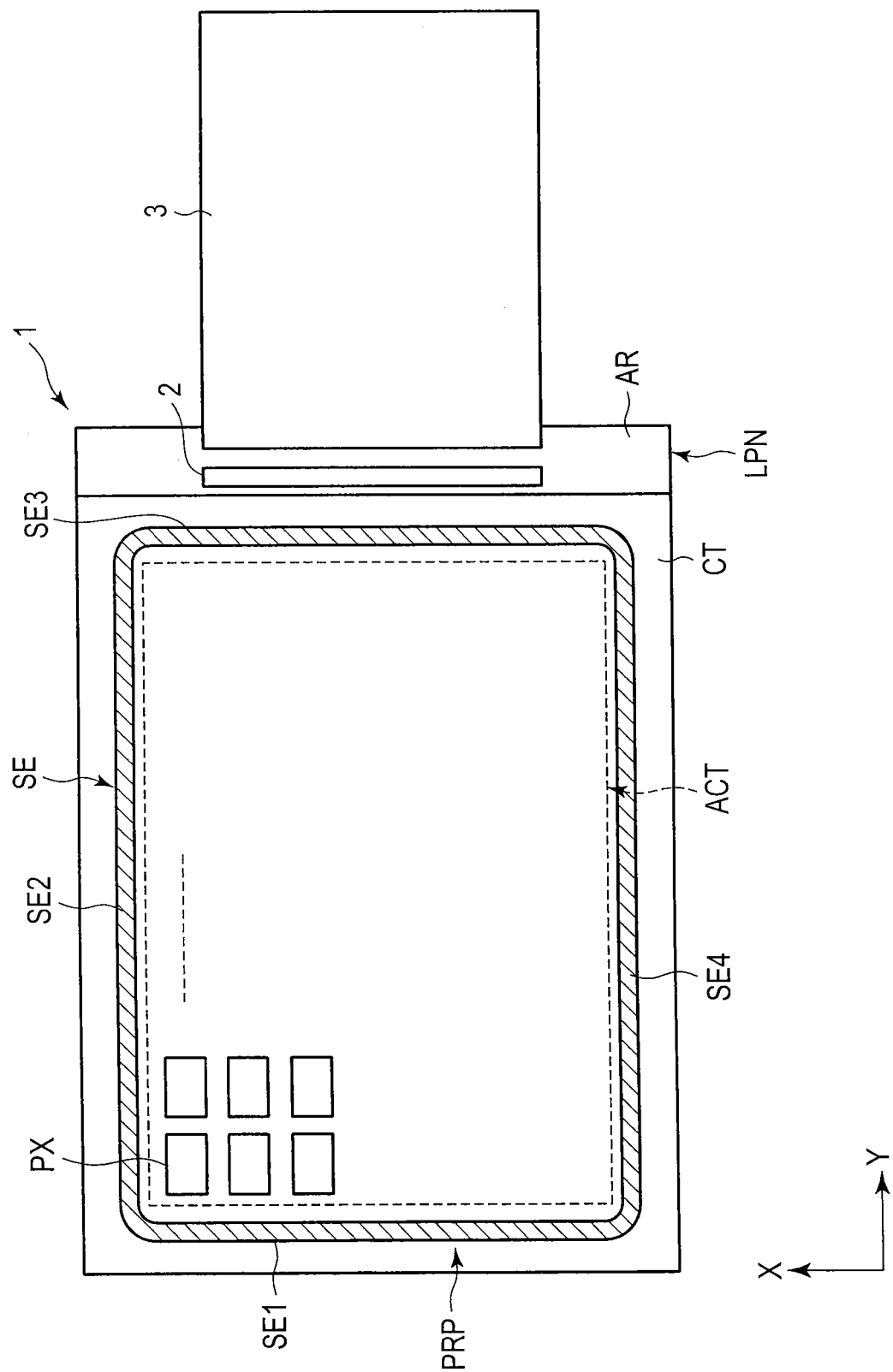
FIG. 1 is a plan view schematically showing a configuration of a liquid crystal display device according to an embodiment.

FIG. 1 is a plan view schematically showing a configuration of a liquid crystal display device 1 according to the present embodiment.

That is, the liquid crystal display device 1 comprises a liquid crystal display LPN of an active matrix type, a driving IC chip 2 connected to the liquid crystal display panel LPN, and a flexible wiring substrate 3.

The liquid crystal display panel LPN comprises an array substrate AR serving as a first substrate, a countersubstrate CT arranged opposite the array substrate AR and serving as a second substrate, and a liquid crystal layer (not shown in the drawings) held between the array substrate AR and the countersubstrate CT. The array substrate AR and the countersubstrate CT are laminated together with a seal material SE. The liquid crystal layer is held inside an area enclosed by a seal material SE in a cell gap formed between the array substrate AR and the countersubstrate CT.

The above-described liquid crystal display panel LPN comprises a substantially rectangular active area ACT located inside the area enclosed by the seal material SE and in which images are displayed. The active area ACT is formed of a plurality of pixels PX arranged in an m×n matrix (m and n are positive integers). The driving IC chip 2 and the flexible wiring substrate 3 are mounted on the array substrate AR in a peripheral area PRP located outside the active area ACT.

In the present embodiment, the seal material SE is shaped substantially like a rectangle between the array substrate AR and the countersubstrate CT so as to form a closed loop. That is, in this example, the seal material SE comprises no inlet formed therein through which a liquid crystal material is injected. The seal material SE comprises four linear portions, that is, a first linear portion SE1 to a fourth linear portion SE4. In the illustrated example, the first linear portion SE1 to the third linear portion SE3 extend along a first direction X. The second linear portion SE2 and the fourth linear portion SE4 extend along a second direction Y orthogonal to the first direction X.

The seal material SE is formed of, for example, an ultraviolet curing resin. Coating of the seal material SE is carried out by a scheme of using a dispenser or the like to drop the seal material so as to draw a line from a start point to an end point. Application of such a scheme requires that the seal material SE be formed uninterruptedly between the start point and the end point. Thus, a portion of the seal material which is applied to the end point is laid on top of a portion of the seal material which is applied to the start point.

For example, when the seal material SE is applied so as to draw a line, first, the application of the seal material is started at the start point. The first linear portion SE1 is partly formed. Then, the second linear portion SE2, the third linear portion SE3, and the fourth linear portion SE4 are sequentially formed. Then, the remaining part of the first linear portion SE1 is formed. The end point portion corresponds to a position which overlaps the start point portion or which lies beyond the start point portion.

Figure 2:
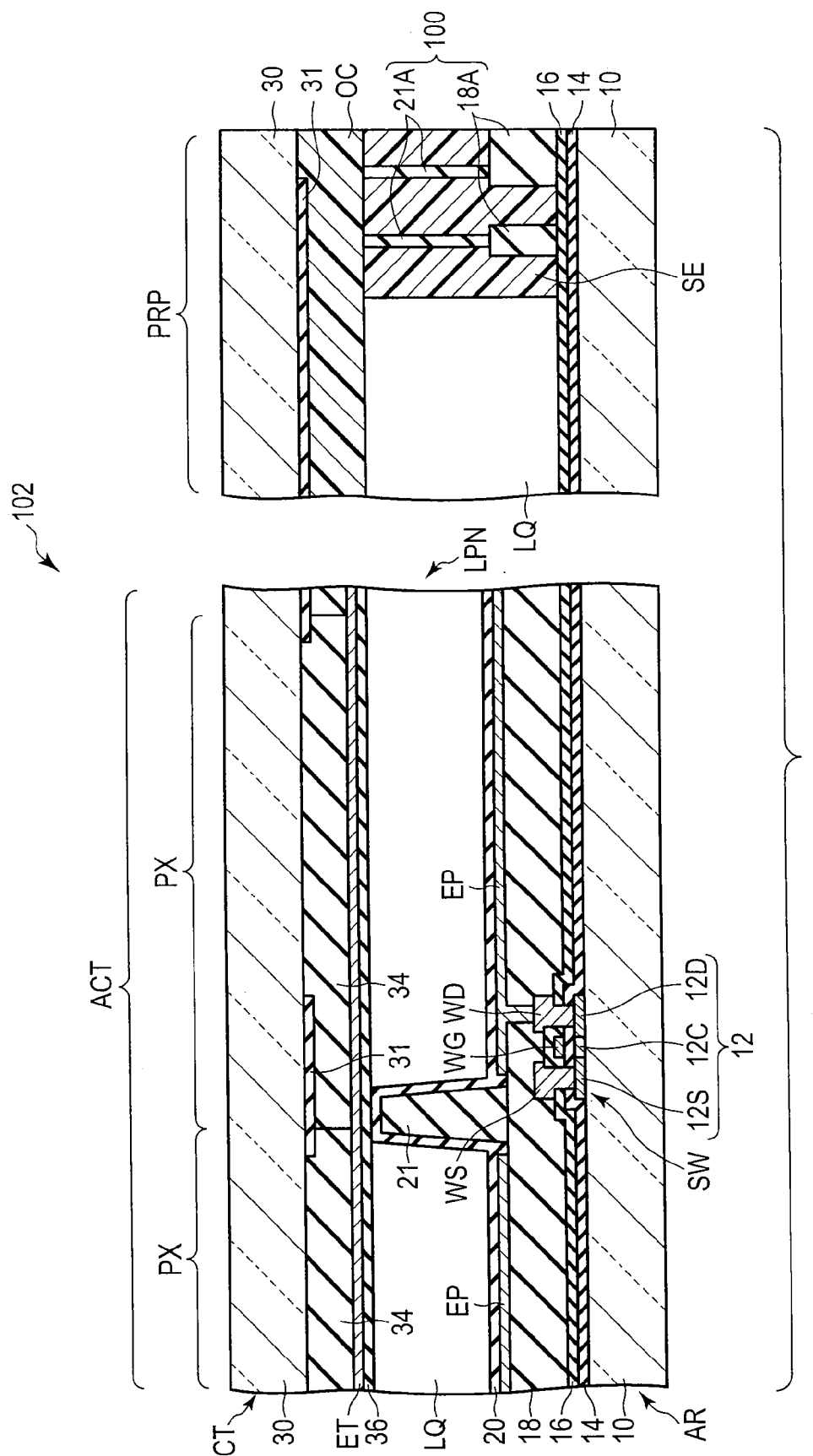
FIG. 2 is a partial cross sectional view of FIG. 1.

FIG. 2 is a cross-sectional view schematically showing a structure in the active area ACT of the liquid crystal display panel LPN shown in FIG. 1 and a structure in the peripheral area PRP, located outside the active area ACT.

That is, the array substrate AR, which forms the liquid crystal display device LPN, is formed using a first insulating substrate 10 such as a glass plate which has light permeability. The array substrate AR comprises a switching element SW and a pixel electrode EP on a side of the first insulating substrate 10 which lies opposite the countersubstrate CT. The illustrated switching element SW is a thin-film transistor of a top gate type. However, the configuration of the switching element SW is not limited to the illustrated example.

The switching element SW comprises a semiconductor element 12 arranged on the first insulating substrate 10. The semiconductor layer 12 can be formed of, for example, polysilicon or amorphous silicon. Here, the semiconductor layer 12 is formed of polysilicon. The semiconductor layer 12 comprises a source area 12S and a drain area 12D on the respective opposite sides thereof with a channel area 12C sandwiched between the source area 12S and the drain area 12D. The semiconductor layer 12 is covered with a gate insulating film 14. The gate insulating film 14 is also arranged on the first insulating substrate 10. Although not shown in the drawings, an undercoat layer that is an insulating film may be interposed between the first insulating substrate 10 and the semiconductor layer 12.

A gate electrode WG of the switching element SW is arranged on the gate insulating film 14 and positioned immediately above the channel 12C of the semiconductor layer 12. The gate electrode WG is covered with a first interlayer insulating film 16. The first interlayer insulating film 16 is also arranged on the gate insulating film 14.

A source electrode WS and a drain electrode WD of the switching element SW are arranged on the first interlayer insulating film 16. The source electrode WS contacts the source area 12S of the semiconductor layer 12 via a contact hole which penetrates the gate insulating layer 14 and the first interlayer insulating film 16. The drain electrode WD contacts the drain area 12D of the semiconductor layer 12 via a contact hole which penetrates the gate insulating layer 14 and the first interlayer insulating film 16.

The source electrode WS and the drain electrode WD are covered with a second interlayer insulating film 18. The second interlayer insulating film 18 is also arranged on the first interlayer insulating film 16. The thus configured second interlayer insulating film 18 is formed of any of various resin materials, for example, an ultraviolet curing resin or a thermosetting resin.

The pixel electrode EP is arranged at each pixel PX in the active area ACT. That is, the pixel electrode EP is arranged on the second interlayer insulating film 18 and electrically connected to the drain electrode WD via a contact hole formed in the second interlayer insulating film 18. The pixel electrode EP is covered with a first orientation film 20.

On the other hand, the countersubstrate CT, which forms the liquid crystal display panel LPN, is formed using a second insulating substrate 30 such as a glass plate which has light permeability. The countersubstrate CT comprises a light blocking layer 31, a color filter layer 34, and a counterelectrode ET on a side of the second insulating substrate 30 which lies opposite the array substrate AR.

The light blocking layer 31 is arranged, for example, between the pixels PX in the active area ACT. The light blocking layer 31 is arranged on the second insulating substrate 30 opposite the switching element SW, provided on the array substrate AR, and various interconnect portions such as gate lines and source lines (not shown in the drawings). The color filter layer 34 is arranged on each of the pixels PX in the active area ACT. The color filter layer 34 is arranged on the second insulating substrate 30, and partly stacked on the light blocking layer 31.

The counterelectrode ET is arranged in the active area ACT. The counterelectrode ET extends on the color filter layer 34. In the active area ACT, the counterelectrode ET lies opposite the pixel electrode EP for each of the pixels PX. The counterelectrode ET is covered with a second orientation film 36.

The color filter layer 34 is arranged on the side of the countersubstrate CT. However, the color filter layer 34 may be arranged on the side of the array substrate AR. In this case, the second interlayer insulating film 18 or the like in the array substrate AR may be replaced with the color filter layer 34. Furthermore, to mitigate the adverse effect of recesses and protrusions on the surface of the color filter layer 34, an overcoat layer formed of a transparent resin material may be arranged between the color filter layer 34 and the counterelectrode ET.

According to the present embodiment, the array substrate AR comprises a columnar spacer 21. That is, the columnar spacer 21 is formed, in the active area ACT, on a surface of the array substrate AR which lies opposite the countersubstrate CT. The columnar spacer 21 is formed on the second interlayer insulating film 18 in the array substrate AR. The columnar spacer 21 is covered with the first orientation film 20.

The columnar spacer 21 is located at a non-display portion which does not contribute to display, that is, at an intersecting portion between the gate line and the source line which is positioned between the pixels PX, or immediately above the source line, the gate line, an auxiliary capacitance line, or the switching element SW. The columnar spacer 21 is formed of any of various resin materials, for example, an ultraviolet curing resin or thermosetting resin.

The array substrate AR and countersubstrate CT as described above are arranged such that the first orientation film 20 on the array substrate AR lies opposite the second orientation film 36 on the second orientation film 36. In this case, the columnar spacer 21 serves to form a predetermined cell gap between the array substrate AR and the countersubstrate CT. The liquid crystal display layer LQ is held in the cell gap formed by the columnar spacer 21.

On the other hand, a pair of guide patterns 100 used for drawing with the seal material SE is provided in the peripheral area PRP, located outside the active area ACT, and is further provided on the first insulating substrate 10 via the gate insulating layer 14 and the first interlayer insulating film 16.

Each of the guide patterns 100 comprises, for example, a first projection 18A and a second projection 21A provided on the first projection 18A.

The guide patterns 100 can be formed during a process of manufacturing an array substrate, simultaneously with, for example, formation of a flattening film or columnar spacers. This prevents an increase in the number of required steps or apparatuses.

Furthermore, a portion of the countersubstrate CT which is located in the peripheral area PRP comprises the second insulating substrate 30, the light blocking layer 31, and a protect film OC.

FIG. 3 to FIG. 8 show schematic cross-sectional views illustrating an example of a process of manufacturing a liquid crystal display device according to the embodiment.

As shown in FIG. 3, first, the first insulating substrate 10 is prepared which comprises the gate insulating layer 14, the first interlayer insulating film 16, and the switching element SW provided on the side of the first insulating substrate 10 which lies opposite the countersubstrate CT.

Figure 4:
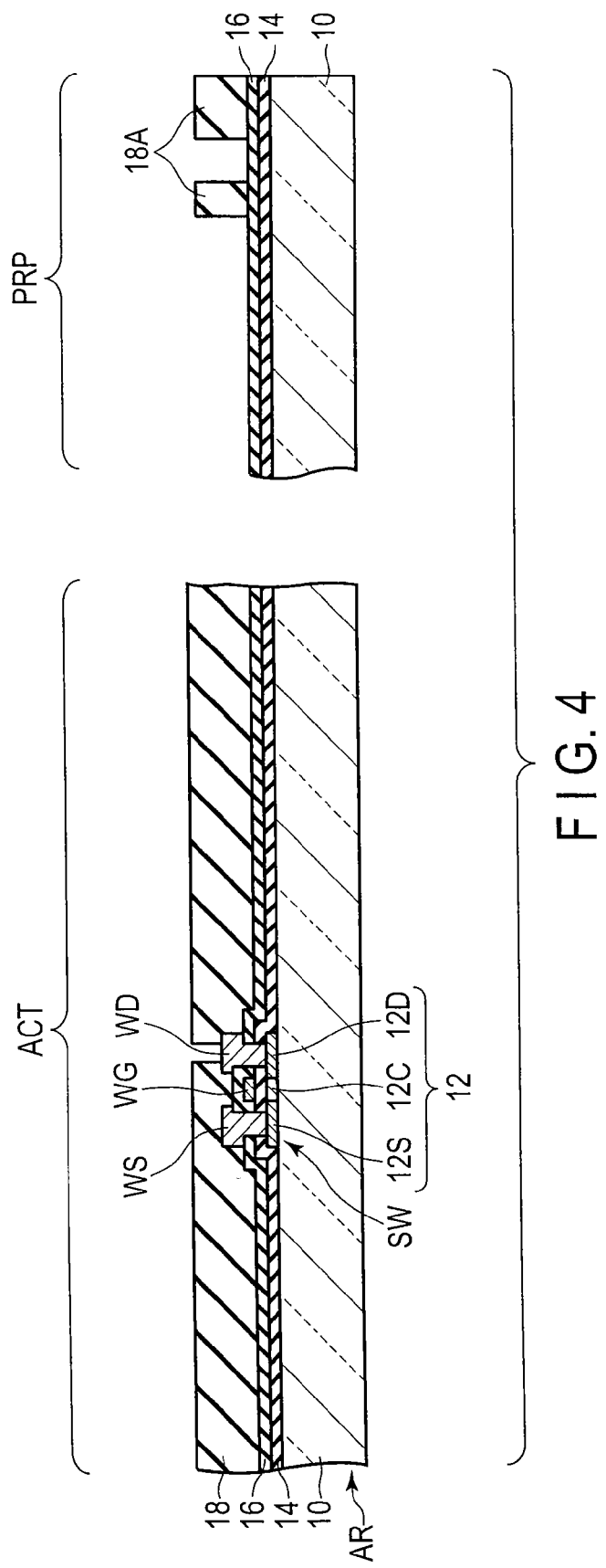
FIG. 4 is a schematic cross-sectional view illustrating the example of the process of manufacturing a liquid crystal display device according to the embodiment.

Then, as shown in FIG. 4, a second interlayer insulating film 18, what is called a flattening film, is formed on the first insulating substrate 10 via the gate insulating layer 14, the first interlayer insulating film 16, and the switching element SW. At this time, the second interlayer insulating film 18 is formed by patterning. At the same time, a pair of first projections 18A with rectangular frame-like patterns is formed in an outer part of the peripheral area PRP by patterning.

Figure 5:
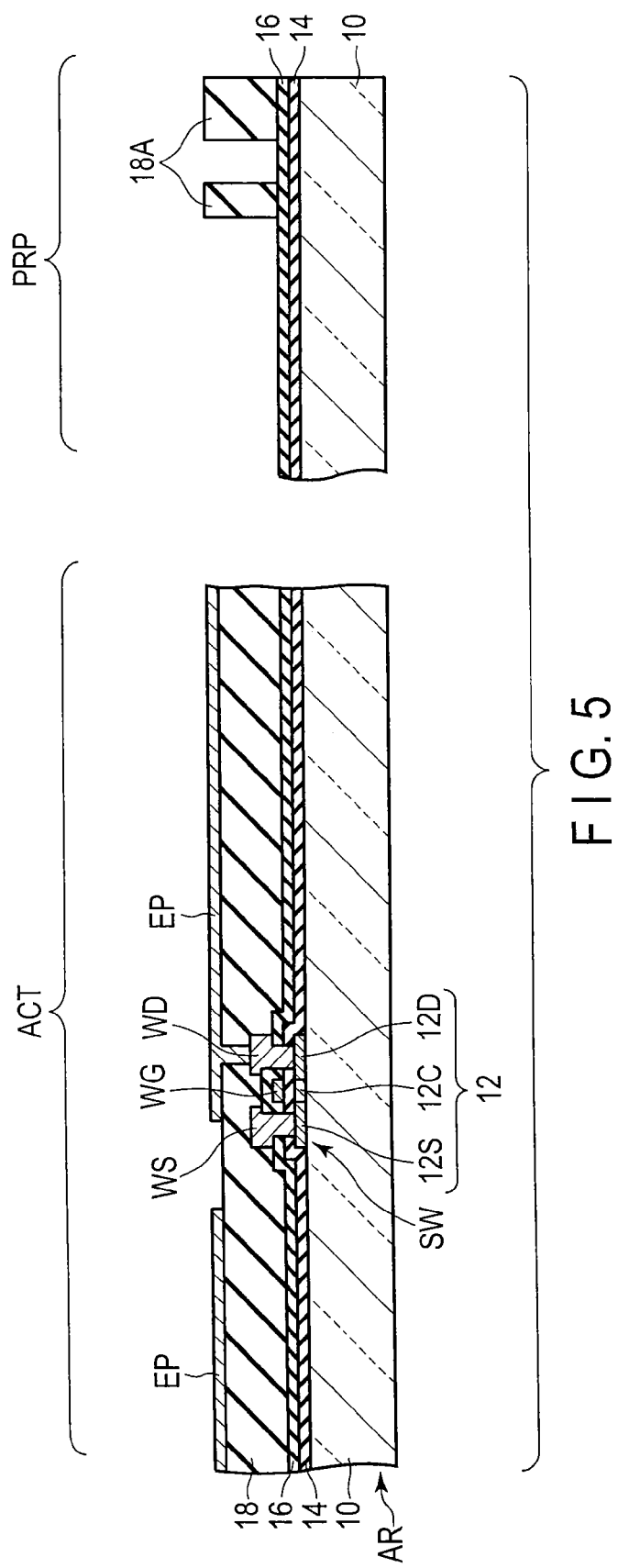
FIG. 5 is a schematic cross-sectional view illustrating the example of the process of manufacturing a liquid crystal display device according to the embodiment.

Subsequently, as shown in FIG. 5, pixel electrodes EP are each formed on the second interlayer insulating film 18 so as to be electrically connected to the drain electrode WD via the contact hole.

Figure 6:
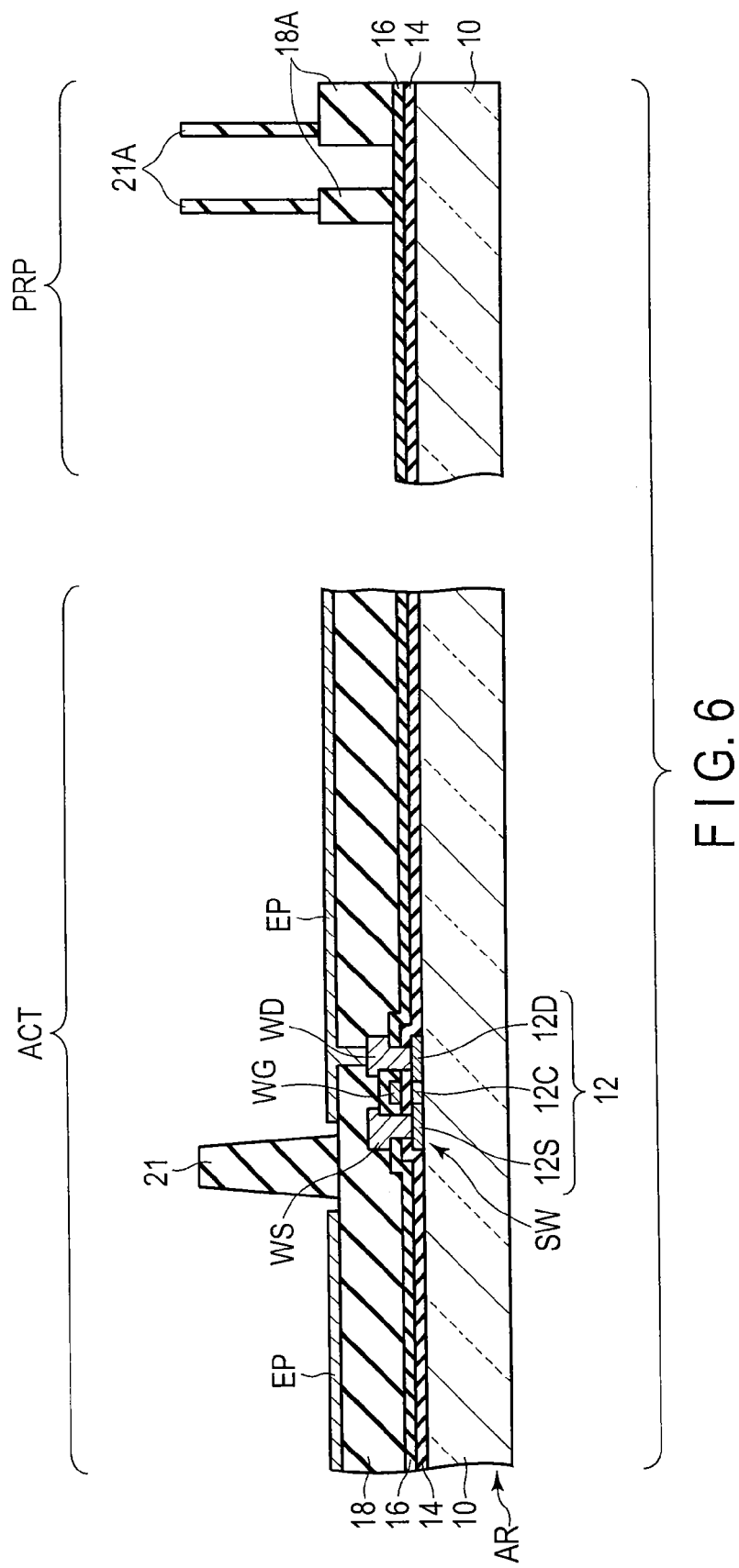
FIG. 6 is a schematic cross-sectional view illustrating the example of the process of manufacturing a liquid crystal display device according to the embodiment.
Figure 7:
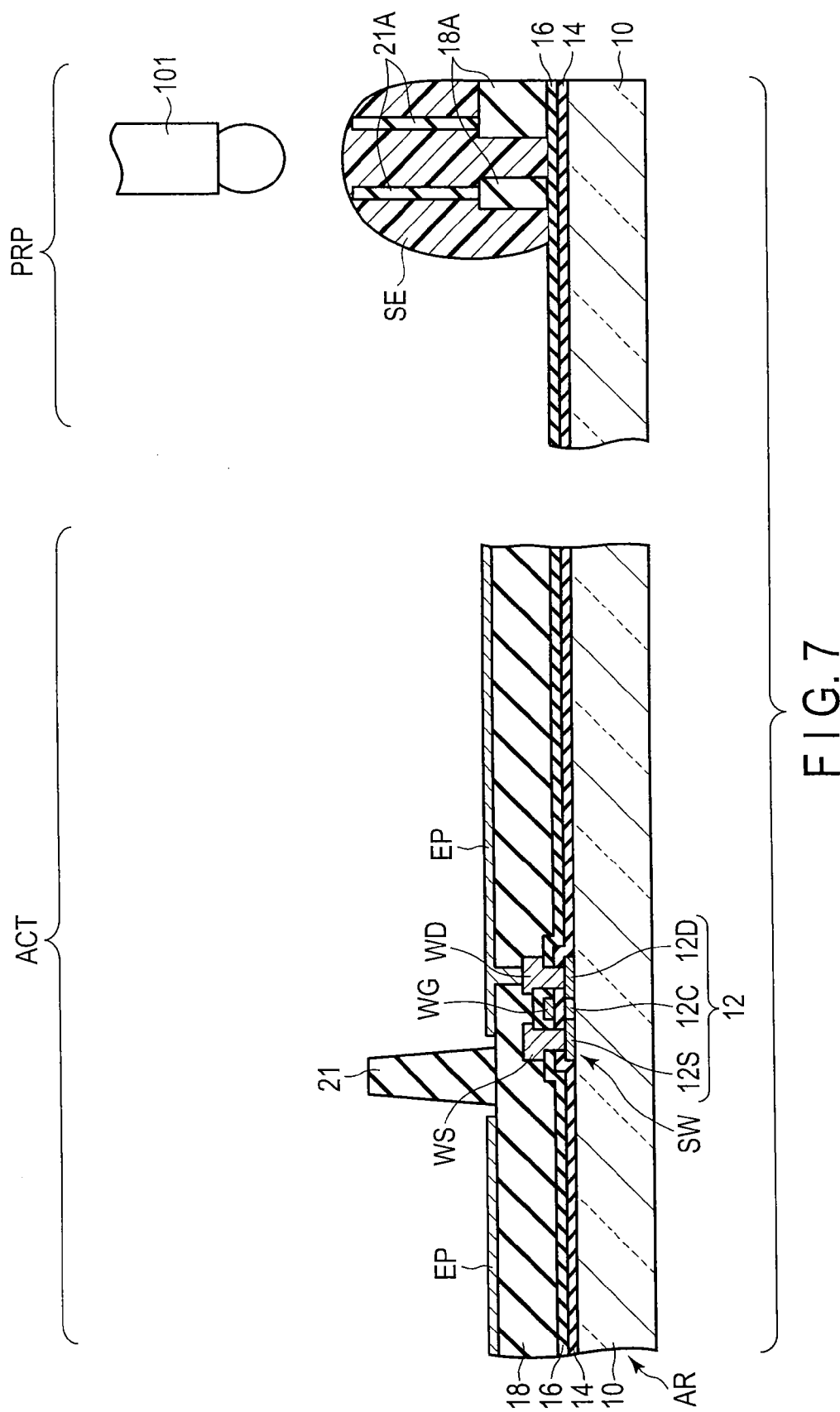
FIG. 7 is a schematic cross-sectional view illustrating the example of the process of manufacturing a liquid crystal display device according to the embodiment.
Figure 8:
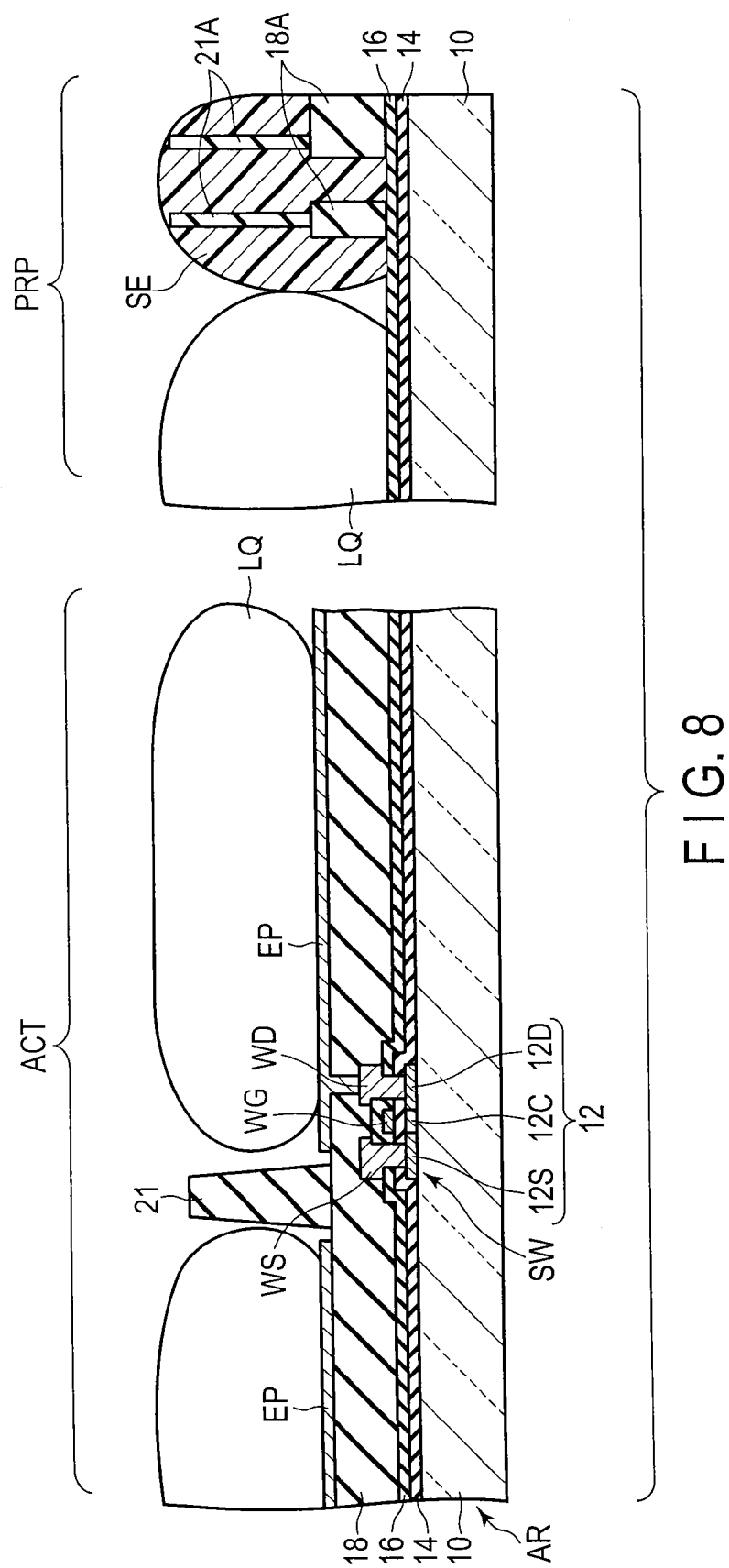
FIG. 8 is a schematic cross-sectional view illustrating the example of the process of manufacturing a liquid crystal display device according to the embodiment.

Moreover, as shown in FIG. 6, a columnar spacer 21 is formed on the second interlayer insulating film 18. At this time, the columnar spacer 21 is formed by patterning. At the same time, a second projection 21A is formed on each of the pair of first projections 18A by patterning. Thus, guide patterns 100 are obtained which comprises the pair of first projections 18A and the pair of second projections 21A.

Thereafter, a dispenser 101 or the like is used to drop the seal material SE, for example, an ultraviolet curing resin, between the pair of projections of the guide patterns 100 so as to draw a rectangular frame from the start point to the end point thereof. When the seal material SE is dropped between the pair of projections of the guide patterns 100, even if the dispenser 101 is misaligned, the deviation of the position to which the seal material is applied is corrected by the pair of projections. The degree of off-centering of the seal member is reduced to stabilize the shape of the seal material.

Then, a liquid crystal material LQ is dropped into an area enclosed by the seal material SE.

Thereafter, the countersubstrate CT is aligned with and attached to the array substrate AR to which the seal material SE and the liquid crystal material have been applied. Thus, a liquid crystal display device 102 shown in FIG. 2 is obtained.

Figure 9:
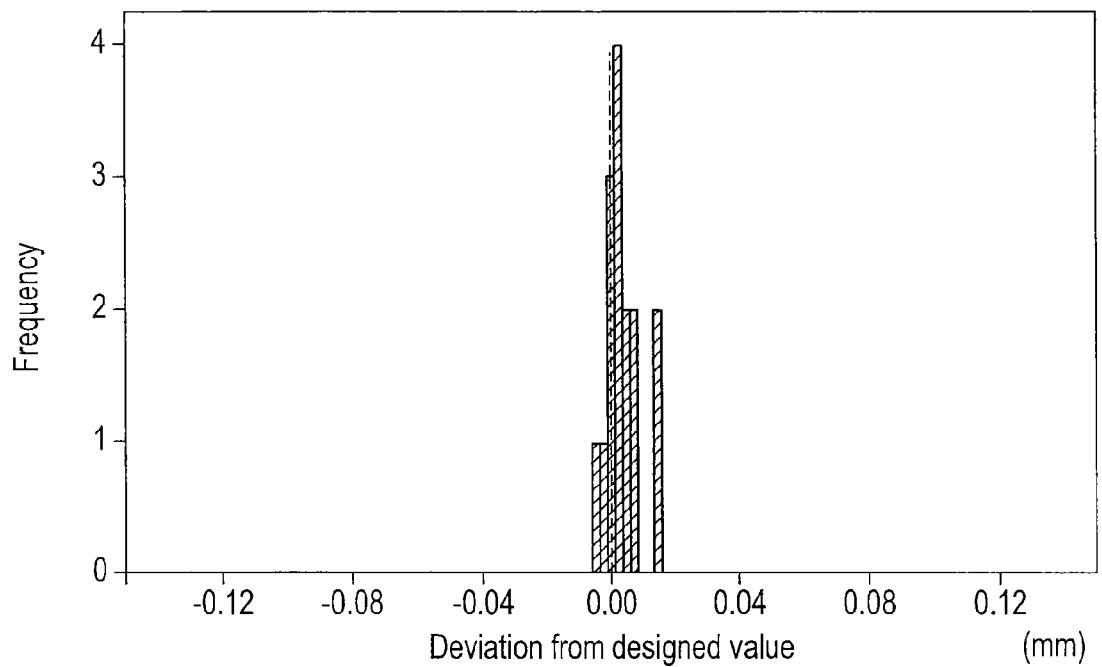
FIG. 9 is a graph illustrating a variation in the position of a seal material in the liquid crystal display device according to the embodiment.

FIG. 9 shows a graph illustrating a variation in the position of the seal material in a liquid crystal display device with a structure similar to that shown in FIG. 2.

Here, the liquid crystal display device used for measurement has a size of, for example, 3.5 inches.

Furthermore, the liquid crystal display device used for measurement is configured as follows. For example, one of the pair of first projections 18A, that is, the display area-side first projection 18A is closer to the display area is 40 μm in width, and the outer peripheral first projection 18A is 80 μm in width. The display area-side first projection 18A and the outer peripheral first projection 18A can be arranged with a distance of 20 μm between the first projections 18A. Moreover, for the pair of second projections 21A, each of the second projections 21A is 20 μm in width. The second projections 21A can be arranged with a distance of 40 μm between the projections 21A. Additionally, the distance between the outer peripheral second projection and the outer periphery can be set to 50 μm.

Five structures were prepared in which the seal material SE was dropped between the two projections of the guide patterns. In each of the structures, the distance from each of three measurement points to a predetermined position (designed value) to which the seal was applied was measured. A graph in FIG. 9 shows the distance and the number of measurement points for the distance.

The graph in FIG. 9 shows that for the misalignment between the designed center of the applied seal and the center of the actually applied seal, the average value is +4 μm, the maximum value is +16 μm, and the minimum value is −5 μm, the range of the misalignment is 21 μm, and the standard deviation 3σ of the variation is 0.018.

Figure 10:
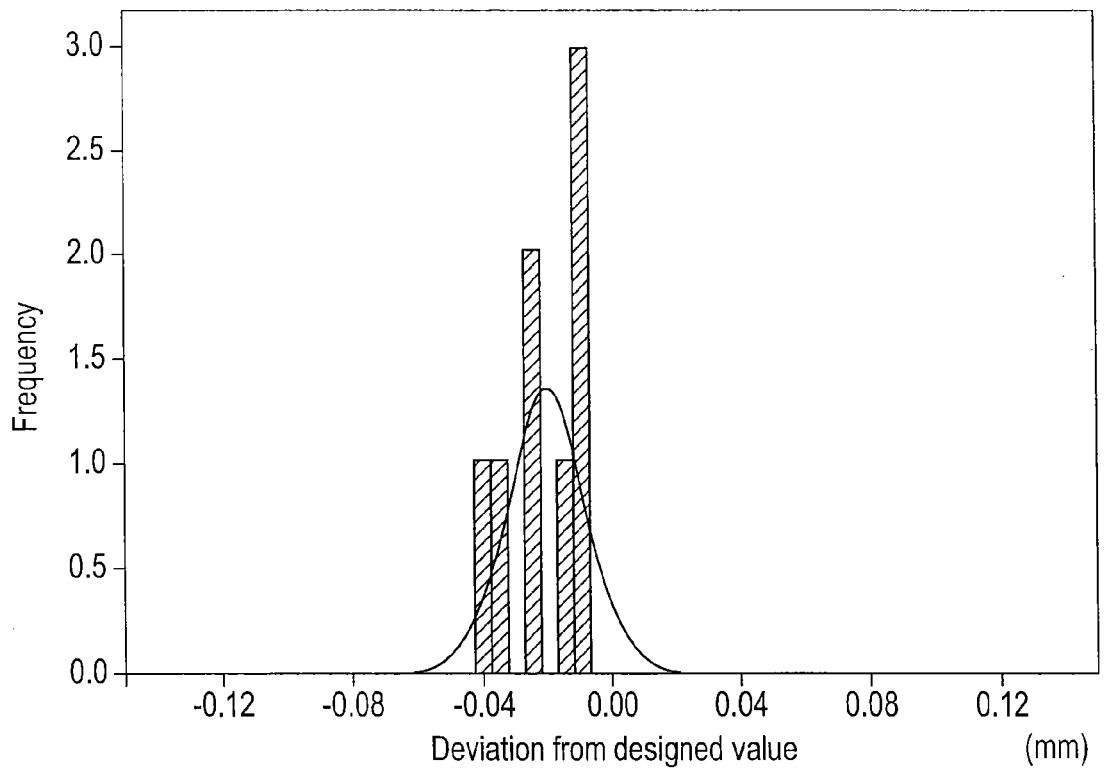
FIG. 10 is a graph illustrating a variation in the position of a seal material in a comparative liquid crystal display device.

FIG. 10 shows a graph illustrating the results of measurement of a variation in the position of a seal material in a comparative liquid crystal display device.

Here, the liquid crystal display device used for the measurement is configured similarly to the liquid crystal display device shown in FIG. 2 except that the former liquid crystal display device comprises no guide patterns 100.

A method for measurement in this case is as follows. Eight structures were prepared in which the seal material SE was dropped in the peripheral area PRP. In each of the structures, the distance from one measurement point to a predetermined position (designed value) to which the seal was applied was measured. A graph in FIG. 10 shows the distance and the number of measurement points for the distance.

The graph in FIG. 10 shows that for the misalignment between the designed center of the applied seal and the center of the actually applied seal, the average value −21 μm, the maximum value is −8 μm, and the minimum value is −39 μm, the range of the misalignment is 31 μm, and the standard deviation 3σ of the variation is 0.036.

FIG. 9 and FIG. 10 show that the variation in the position of the seal material in the liquid crystal display device with a structure similar to that shown in FIG. 2 is insignificant.

FIG. 11 to FIG. 14 show diagrams illustrating another embodiment of the guide patterns.

As shown in FIG. 11 to FIG. 14, the liquid crystal display device according to this embodiment comprises, in the peripheral area PRP of the array substrate AR, a guide pattern 209 with a pair of projections, a guide pattern 205 provided closer to the display area than the guide pattern 209, and a guide pattern 303 provided closer to the outer periphery than the guide pattern 209. The guide pattern 209 comprises, for example, a first projection 206 which can be formed simultaneously with a flattening film, and a pair of second projections 207 and 208 which can be formed simultaneously with a columnar spacer provided on the first projection 206. The guide pattern 205 comprises a first projection 203 and a second projection 204 provided on the first projection 203. The guide pattern 303 comprises a first projection 301 and a second projection 302 formed on the first projection 301.

Figure 11:
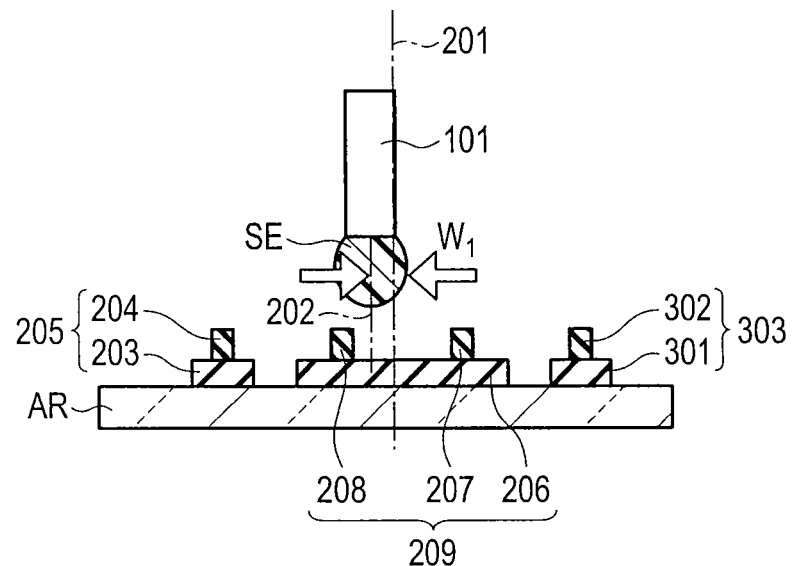
FIG. 11 is a diagram illustrating an alternative embodiment of a guide pattern for use in the above-described embodiment.
Figure 12:
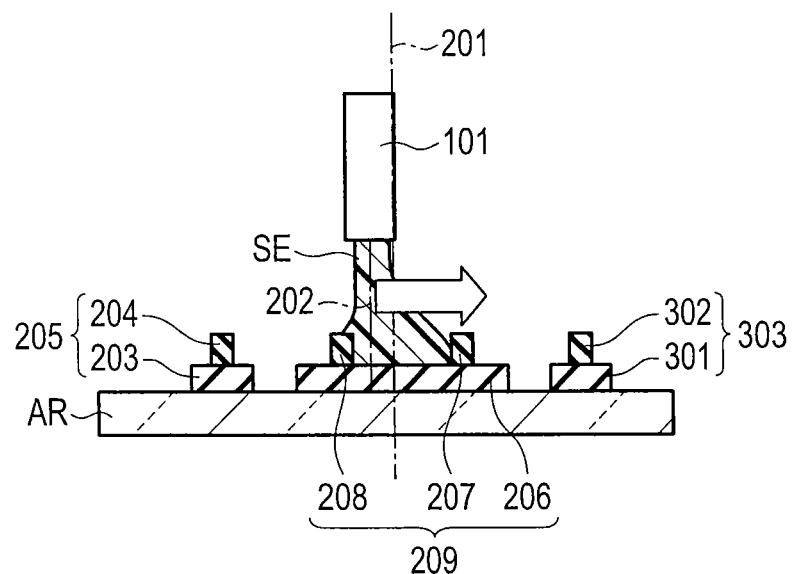
FIG. 12 is a diagram illustrating the alternative embodiment of the guide pattern for use in the above-described embodiment.

As shown in FIG. 11, the dispenser 101 is used to drop the seal material SE between the pair of second projections 207 and 208 of the guide pattern 209, positioned in the center of the three types of guide patterns. Then, even if a center 202 of the dispenser 101 is misaligned with a designed center of the seal material by a width W1, the position of the applied seal member SE is corrected between the second projections 207 and 208 as shown in FIG. 12. Thereafter, even if the seal material SE spreads to the guide pattern 205 and to the guide pattern 303, the corrected position of the applied seal makes a misalignment width W2 between the center 2031 of the actually applied seal material SE and the designed center 201 of the seal material smaller than the width W1 as shown in FIG. 13.

That is, when the pairs of projections of the guide patterns are arranged in the areas in which the seal material is coated and parallel to the direction of application of the seal material, capillary action occurs to facilitate the spread of the seal material parallel to the direction of application of the seal material. Furthermore, in a direction perpendicular to the direction of application of the seal material, the arrangement of the pairs of projections serving as guide patterns increases the area in which the seal material contacts components of the device; in the structure including the pair of projections, the seal member contacts the projections and the substrate, whereas in a structure only with a substrate, the seal member contacts only the substrate. Consequently, the structure according to the present embodiment enhances surface tension. This restricts the seal material from spreading in the direction perpendicular to the direction of application of the seal material. Thus, as shown in FIG. 14, the position of application of the seal material is corrected to suppress a variation in the position of the actual seal material center relative to the designed value for the seal material center. Therefore, the present embodiment provides a liquid crystal display device with a seal material with a stable shape.

The above-described results are obtained by dropping and coating the seal material between the pair of projections of the guide patterns. Furthermore, the distance between the pair of projections of the guide patterns is short, and during coating, the seal material spreads over at least the guide patterns with the pair of projections. Thus, in a manufactured liquid crystal display device, at least one projection of the pair of projections of the guide patterns is covered with and located inside the seal member. The configuration of the liquid crystal display panel LPN is not limited to the configuration shown in FIG. 2. The counterelectrode ET may be provided on the array substrate AR on which the pixel electrode EP is provided. Additionally, the liquid crystal mode is not particularly limited. The following are applicable: modes such as a twisted nematic (TN) mode, an optically compensated bend (OCB) mode, and a vertically aligned (VA) mode which mainly utilize vertical electric fields and modes such as an in-plane switching (IPS) mode and an fringe field switching (FFS) mode which mainly utilize horizontal electric fields.

In addition, optical elements including a polarizing plate are arranged on at least one outer surface of the liquid crystal display panel LPN, that is, an outer surface of the array substrate AR or an outer surface of the countersubstrate CT. However, the illustration of the optical elements is omitted.

The liquid crystal injection scheme is not limited to the one drop fill but may be another scheme such as vacuum injection. According to the vacuum injection scheme, the shape of the applied seal material is not a closed loop, but an inlet is provided and may be sealed after injection of a liquid crystal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a pair of substrates;
   guide patterns provided at a periphery of one substrate of the pair of substrates and comprising a central pattern comprising a first projection and two second projections on the first projection, and a pair of side patterns provided on both sides of the central pattern, each of the side patterns comprising a third projection and a fourth projection formed on the third projection;
   a seal material provided on the guide patterns and covering at least the first projection and the second projections; and
   a liquid crystal layer provided in an area partitioned by the pair of substrates and the seal material.

2. The liquid crystal display device according to claim 1, further comprising a flattening film on the one substrate.

3. The liquid crystal display device according to claim 1, further comprising a spacer on the one substrate, the spacer being configured to control a distance between the substrates.

4. The liquid crystal display device according to claim 1, further comprising
   a flattening film on the one substrate; and
   a spacer on the one substrate, the spacer being configured to control a distance between the substrates,
   wherein formation of the first projection is carried out with formation of the flattening film, and formation of the second projection is carried out with formation of the spacer.

* * * * *